United States Patent [19]

Claude et al.

[11] 4,310,172

[45] Jan. 12, 1982

[54] POSITION CONTROL SYSTEM

[75] Inventors: George T. Claude, Bellbrook; Jerry W. Burns, Jamestown, both of Ohio

[73] Assignee: General Motors Corporation, Detroit, Mich.

[21] Appl. No.: 32,698

[22] Filed: Apr. 23, 1979

[51] Int. Cl.$^3$ .......................................... B60G 21/00
[52] U.S. Cl. .................................... 280/703; 91/390; 280/707
[58] Field of Search ............... 280/707, 703, 711, 702, 280/DIG. 1; 91/390; 60/390

[56] References Cited

U.S. PATENT DOCUMENTS

| | | | |
|---|---|---|---|
| 3,524,634 | 8/1970 | Schmidt | 280/707 |
| 3,752,039 | 8/1973 | Hewins | 60/390 |
| 3,830,138 | 8/1974 | Joneleit | 91/390 |
| 4,017,099 | 4/1977 | Hegel et al. | 280/707 |
| 4,054,295 | 10/1977 | Elliott | 280/707 |

FOREIGN PATENT DOCUMENTS 1205714  9/1970  United Kingdom .................. 91/390

*Primary Examiner*—Joseph F. Peters, Jr.
*Assistant Examiner*—Ross Weaver
*Attorney, Agent, or Firm*—Charles R. White

[57] ABSTRACT

A height sensor is provided in a vehicle leveling system having an air spring including a pressurized chamber connected between sprung and unsprung vehicle masses. In one embodiment magnets located on a pair of followers within the chamber and attached for movement with the unsprung mass produce magnetic fields which pass through the wall of the chamber. A pair of detectors outside the chamber and mounted on the sprung mass for movement therewith detects the magnetic fields and thereby the movement of the followers to determine the relative spacing of the sprung and unsprung masses. In a second embodiment the magnetic devices and detectors are outside of the chamber with a follower internal of the chamber adapted to interrupt the magnetic field therebetween to determine the relative spacing of the sprung and unsprung masses.

6 Claims, 6 Drawing Figures

POSITION CONTROL SYSTEM

This invention relates to position control systems and more particularly to a new and improved vehicle suspension system with automatic level control to maintain the vehicle at a trim height.

Prior to the present invention, many leveling systems have been employed to adjust the trim height of a vehicle by varying the distance between the sprung and unsprung vehicle masses. With such systems various loads and load distributions can be handled to improve the stability and operating characteristics of a vehicle. In some of these systems air adjustable shock absorbers have been employed with mechanical suspension springs. With appropriate control over the supply and exhaust of air to the air adjustable shock absorbers, spring rate can be varied to adjust vehicle trim height in accordance with load conditions. While these prior systems have been satisfactory and have successfully met prior needs, they often cannot fully meet new automotive standards in which reduced weight is required for improved fuel efficiency and where an improved suspension is required for smaller vehicles that experience a substantial increase in the proportional difference in the load on the vehicle's suspension system between its loaded and unloaded condition.

With these general objectives in mind this invention provides for improved fuel efficiency with a new and improved lightweight ride control system that effectively maintains high ride quality and further meets consumer needs for passenger and luggage capacity. In this invention an improved attitude control and leveling system is provided which replaces the prior mechanical suspension spring and air adjustable shock absorber system. This invention provides a lightweight and automatic level control system which is more responsive to load conditions and which quickly adjust for load conditions to keep the vehicle in trim. With this invention the prior mechanical torsion bars, coil springs and leaf springs are eliminated and replaced by new and improved air spring units. With air springs replacing the mechanical springs, further improvements are made with this invention by providing automatic adjustment of the spring rate of the air spring to provide for improved attitude control over the suspension system. This control is responsive to a wide range of load conditions from a fully maximized load to an unloaded operating condition.

In the present invention high pressure pneumatic springs are employed with double acting hydraulic shock absorbers coupled therein which serve to damp oscillations and vibratory action of the pneumatic springs. In this invention special position responsive follower rods are mounted within the pneumatic chambers of the spring and without breaching the integrity of the high pressure chamber of the springs which advise sensor means external of the chamber as to the attitude or position of the sprung mass of the vehicle relative to the unsprung mass. In one preferred embodiment of this invention a pair of adjustable follower rods unequal in length are located entirely within the confines of the high pressure pneumatic chamber without requiring any mechanical penetration of the chamber. These rods extend vertically from support with a bottom plate secured to the unsprung mass of the vehicle toward a top plate secured to the sprung mass of the vehicle. The rods are mounted so that they are capable to being telescoped inwardly by an upper cap as the distance between the sprung and unsprung masses of the vehicle reach a pre-determined distance from one another. The rods are spring biased outwardly from a fully telescoped position to a pre-determined outward distance. Each of the rods has a permanent magnet in the upper end thereof which generates a magnetic field that under certain conditions excites associated Hall effect devices mounted in an integral height sensor external of the pneumatic spring. This height sensor operating through a module signals an electrically driven compressor to supply air to the air springs under certain conditions or signals an exhaust valve to exhaust air from the spring under certain other conditions. When the vehicle is at trim height the pressure conditions within the pneumatic chambers are effectively maintained.

In another preferred embodiment of the invention both the Hall effect devices and the magnets are attached to the sprung portion of vehicle and located in a sensor unit external of the high pressure pneumatic chamber being separated by a gap which is adapted to receive a steel vane of a follower attached to the unsprung portion of the vehicle and disposed internally of the pneumatic chamber. In the trim position the vane interrupts the field of a lower magnet so that only an upper Hall effect device senses the field of the upper magnet so that controls will not supply or exhaust pressure air to or from the pneumatic chamber. When the vehicle is low, the vane interrupts the field of both magnets so that control will effect supply of pressure air to the pneumatic chamber until the trim condition is obtained. If the vehicle is high, the Hall effect devices and their associated magnets are moved away from the vane so that the control will reduce the air pressure until the trim condition is reached. The vertical spacing the Hall effect devices and their associated magnets provides a null zone so that limited ride motions do not trigger the supply or exhaust of air to and from the pneumatic suspension springs. By the simple substitution of a new sensor unit for the original sensor unit having different spacing between the Hall effect devices and the associated permanent magnets a different null zone or dead band can be readily obtained. These and other features, objects and advantages of this invention will be more apparent from the following detail description and drawing in which:

Figure 1:
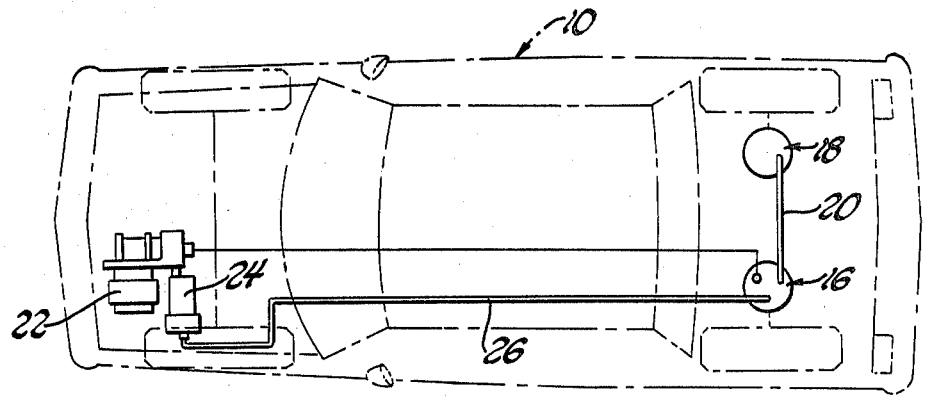
FIG. 1 is a diagrammatical plan view of a wheeled motor vehicle with air spring units providing the rear suspension therefor.
Figure 2:
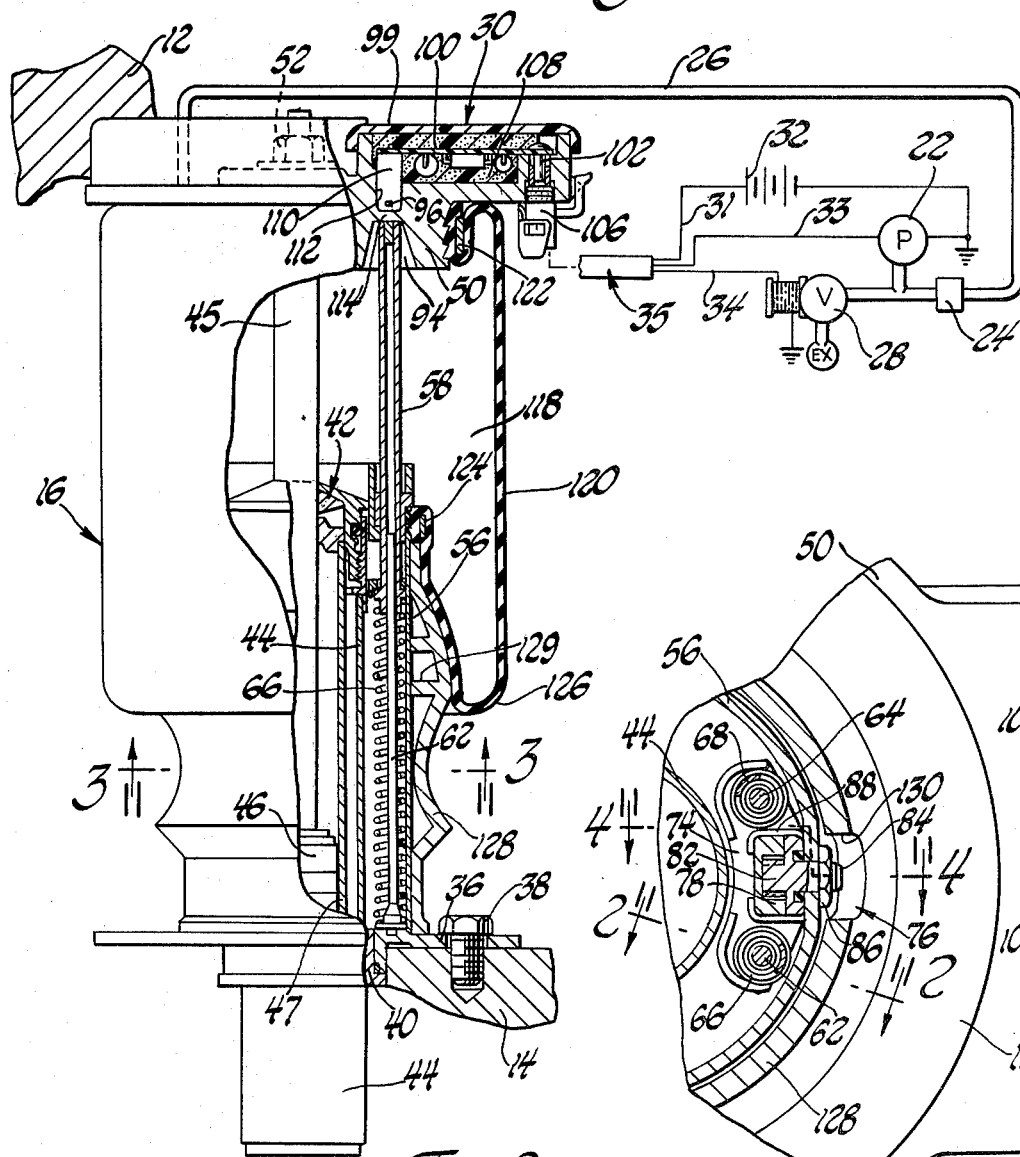
FIG. 2 is an elevational view of one of the air spring units partially in section along lines 2—2 of FIG. 3 and with controls shown in diagram.
Figure 3:
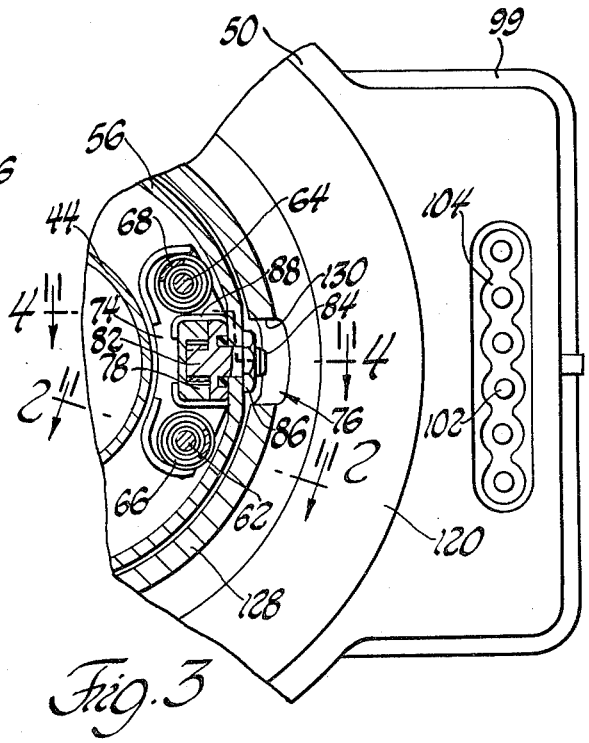
FIG. 3 is a view taken along line 3—3 of FIG. 2.

Turning now in greater detail to the drawing there is illustrated by FIG. 1 and 2 an automotive vehicle 10 having sprung and unsprung masses 12 and 14 operatively connected by a pair of air spring suspension units 16 and 18. Air spring unit 16 and air spring unit 18, pneumatically interconnected to unit 16 by air line 20 are supplied with pressurized air from electrically driven compressor 22 through an air drier 24 and air line 26 to increase the distance between the sprung and unsprung masses of the vehicle to increase vehicle curb height. Exhaust valve means 28 are incorporated with the compressor and air drier for exhausting pressure from the air spring units 16 and 18 to decrease the distance between the sprung and unsprung masses of the vehicle to thereby lower vehicle curb height.

Height sensor unit 30, integral with and operatively mounted on top of air spring unit 16, is connected by conductor 31 to a battery and is energized thereby to generate electrical pulses which are transmitted through conductors 33 and 34 of wiring harness 35 to the compressor 22 and to the solenoid of exhaust valve 28 to control these components.

The pneumatic air spring unit 16 has a mounting plate 36 adjacent the lower end thereof which is secured by fastener means 38 to the unsprung mass 14 of vehicle 10. The mounting plate has a central cylindrical opening therein in which a cylindrical collar 40 is secured. A double acting hydraulic shock absorber 42 such as that disclosed in U.S. Pat. No. 3,203,511 to P. G. Long, Jr. for Rod Seal for Shock Absorber, hereby incorporated by reference, is secured to the collar 40. This shock absorber has an elongated cylindrical reservoir tube 44 which extends axially into unit 16. A cylindrical piston rod 45 having a piston 46 fixed to its lower end is mounted for reciprocating movement in oil filled cylinder tube 47 concentrically mounted within the reservoir tube. The piston rod 45 extends through a disc-like upper cap 50, preferably an aluminum casting, of the air spring unit. The upper end of the piston rod is secured to the cap 50 by suitable fastener means including nut 52 threaded onto the end of the piston rod. With this construction relative movement of the sprung and unsprung masses of the vehicle toward and away from one another results in the reciprocating movement of the piston and the piston rod in the cylinder tube for appropriate damping of the action of the vehicle suspension spring units.

As best shown in FIG. 2, the pneumatic air spring suspension unit 16 has a cylindrical lower support 56 disposed radially outwardly with respect to the shock absorber 42. The lower end of this support is secured to the mounting plate 36 and from this end extends upwardly and concentrically with respect to the shock absorber reservoir tube 44.

As shown in FIG. 2 the cylindrical support 56 is radially spaced outwardly from the shock absorber and has a pair of vertical openings in a ring portion in the upper end thereof that slidably receives a pair of follower tubes 58 and 60 of unequal length. These tubes are respectively mounted for telescopic vertical movement on the vertically extending support rods 62 and 64 located between the reservoir tube and cylindrical support 56. The bases of these rods are secured to the mounting plate 36. Disposed around rods 62 and 64 are a pair of helical springs 66 and 68 that have their lower ends seated on the mounting plate 36 and which spiral upwardly into respective terminal engagement with annular shoulders 70 and 72 formed on the lower ends of the tubes 58 and 60 respectively. With this arrangement the follower tubes move with the unsprung mass of the vehicle relative to the sprung mass until the lower surface of cap 50 is contacted by the ends of the tubes.

Figure 4:
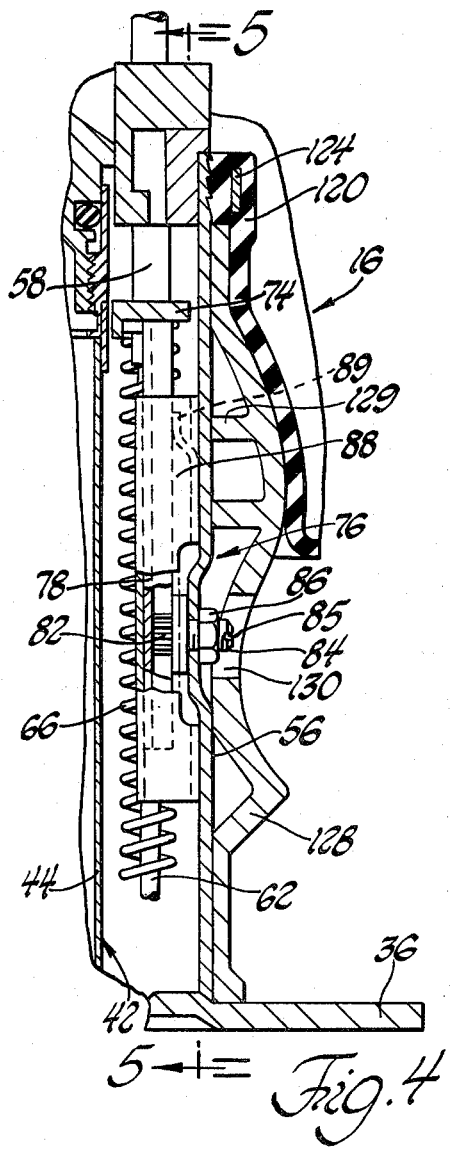
FIG. 4 is a view taken along line 4—4 of FIG. 3.

With springs 66 and 68 urging the follower tubes upwardly their shoulders 70 and 72 contact a portion of a cross member 74 of an adjustable stop assembly 76 which determines the maximum outward position of the tubes with relation to the unsprung mass 14. The stop assembly further includes a rack 78 extending downwardly from cross member 74. The rack is formed with teeth 80 which mesh with the teeth of a spur gear 82 secured to the inner end of a rotatable adjustment shaft 84 that extends radially from the spur gear through an opening in the wall of the cylindrical support 56 providing access external of the unit 16. The shaft 84 has a threaded outer end for receiving a nut 86 which, when advanced on the shaft into engagement with support 56, locks the shaft and the spur gear from rotation to thereby set the position of the stop assembly in an adjusted position. With the cross member thus fixed the extent of the outward position of the follower tubes 58 and 60 is established. Suitable seals are provided with respect to cylindrical support 56 and the adjustment shaft 84 to insure an air tight seal when nut 86 is tightened on shaft 84. The outer end of shaft 84 is slotted at 85 to receive the bit of a screwdriver so that the stop assembly 76 and the cross member 74 thereof can be easily adjusted upwardly or downwardly for setting the trim height of the vehicle. The rack 78 of the stop assembly 76 is slidably supported by a thin wall cage 88 attached to the inner wall of the support 56. This cage embraces the rack as shown in FIGS. 2 and 4. Cage 88 has a tang 89 lanced inwardly into resilient spring engagement with the axially moveable rack to take up any play which might otherwise occur between these components.

The upper end of the follower tubes 58 and 60 carry permanent magnets 90 and 92 fixed therein which are adapted to be positioned under certain conditions by the tubes into a recess 94 formed in the underside of cover 50. These magnets and their fields are moveable relative to a pair of Hall effect devices 96 and 98 as will be hereinafter described.

To accommodate the height sensor assembly 30 the aluminum cap 50 has formed in the outer side thereof a rectangular recess fitted with a removable plastic cover 99. A circuit board 100 containing an electronic circuit for height control is secured within box. The circuit board includes terminals 102 at one edge thereof while a port 104 in the aluminum cap accommodates an electrical connector 106 from the wiring harness 35 to plug into the terminals. Except for the terminals, the component side of the circuit board is embedded in a suitable potting compound 108. The Hall effect devices 96 and 98 are mounted on posts 110 that depend from the circuit board 100 into a recess 112 formed in the top surface of the cap 50. Recess 94 for the magnets 90 and 92 is separated from recess 112 for the Hall effect devices by a thin wall 114 of the aluminum casting which comprises the cap 50.

When the compressor 22 is energized by battery 32 pressurized air will be supplied by the compressor through line 26 into an expansible and contractable pressure chamber 118 formed by a sleeve 120 of a fabric reinforced elastomeric material disposed around piston rod 45 and the upper portion of the shock absorber. The upper end of the sleeve 120 is secured in an air tight manner by steel band 122 to an annular and downwardly extending neck portion of the cap 50. The lower end of the sleeve is reversely curved inwardly and is attached to the upper end of cylindrical support 56 by band 124. The sleeve forms a rolling lobe 126 which contacts and rolls over the profiled outer periphery of a fixed piston 128 which is disposed around the cylindrical support 56 and which has internal ribs 129 that contact the support to provide a firm base for the lobe as it rolls on the profile provided by the varying diameters of the fixed piston. The opening 130 in the piston 128 provides access opening to the height adjustment shaft 84. As load is increased the distance between the sprung and unsprung masses of the vehicle decreases as the lobe rolls downwardly on piston 128. In the event of a decreasing load the sprung and unsprung masses of the vehicle are moved away from one another by the air spring as the lobe rolls upwardly on the fixed piston 128.

FIG. 2 illustrates the air spring units suspending the vehicle body at a pre-determined trim height with respect to the unsprung vehicle mass and the roadway. The magnetic field of the permanent magnet 90 is sensed by the Hall effect device 96 while Hall effect device 98 is not close enough to the field of its associated magnet 92 to affect the circuitry. Under such condition the circuit pulses in response to the output of only Hall device 96 to close the exhaust valve and shut off compressor 22 so that air is not supplied or exhausted from the air springs of units 16 and 18. In the event that the load on the vehicle is increased to the point whereby the sprung mass will move toward the unsprung mass the cap 50 strokes tube 58 downwardly as the sleeve rolls downwardly on the contoured piston. When the downward movement of the cap 50 passes a pre-determined 15 mm downward dead band movement it will come into close proximity to the permanent magnet 92 disposed on the follower tube 60. When the flux field of this magnet is sensed by the Hall device 98, the circuit responds by energizing the compressor so that it supplies pressure air to the air spring units 16 and 18 through line 26 are previously reported the Hall effect device 96 continued to provide an output and the exhaust valve remains closed. Pressurized air is supplied to increase the pressure in chamber 118 causing the air spring to increase in length and the rolling lobe 126 to roll upwardly on the fixed piston 128. This continues until the point is reached whereby the magnetic field of the permanent magnet 92 no longer is sensed by Hall device 98. The vehicle is thus returned to the trim and the compressor is de-energized.

Figure 5:
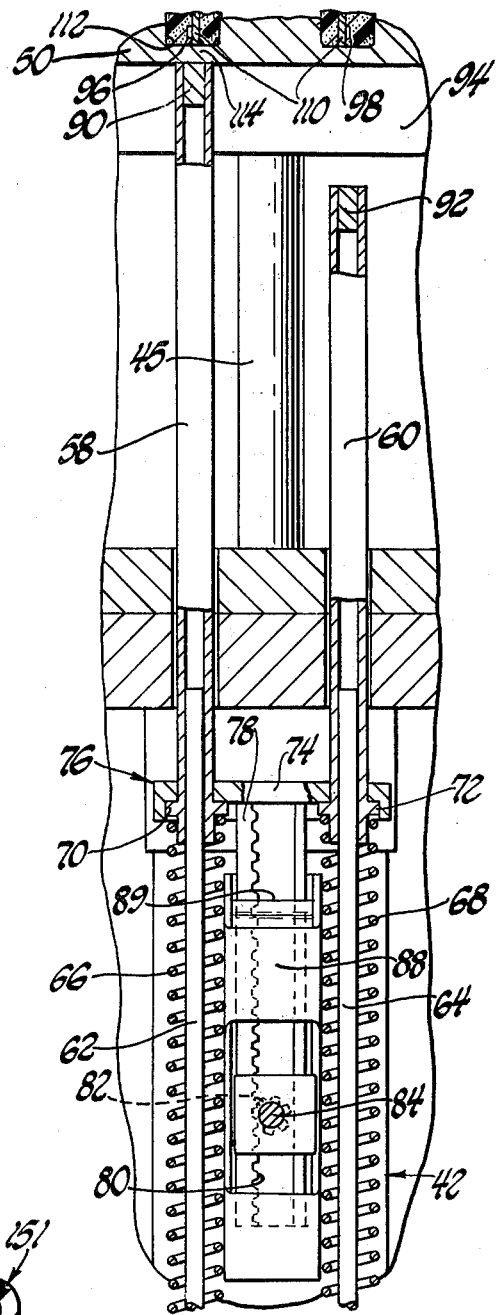
FIG. 5 is a sectional view taken along lines 5—5 of FIG. 4.

In the event that the load is reduced to a point where the cap 50 and the Hall devices are moved upwardly from the FIG. 5 position by air spring elongation and from close proximity from the field of magnet 90, the Hall device 96 is no longer able to respond to the field of magnet 90 and Hall device 98 remains in an off state. Under these conditions the pulsing circuit effects energization of the solenoid of the exhaust valve 28 to release air pressure from the pressure chamber 118 from the unit 16 and the corresponding chamber from unit 18. The compressor remains de-energized and as a result of such pressure reduction the air spring contract and the sprung portion of the vehicle moves toward the unsprung portion 14 until the trim height position of FIG. 2 is re-established.

In the event that trim adjustment is needed the nut 86 is loosened and shaft 84 is turned to raise or lower the cross-member 74 of the adjustable stop assembly 76, and hency vary the uppermost position of the follower tubes as previously described. If the trim height needs to be reduced the stop assembly 76 is moved downwardly so that the sprung mass of the vehicle will be moved downwardly for the trim condition of suspension. If the trim height needs to be increased the adjustable stop assembly is raised to a position whereby the magnets 90 and 92 are moved upwardly to a higher predetermined position. The trim operation will be as previously described. In this embodiment of the invention static and dynamic seals have been eliminated since the Hall effect devices can sense the presence of the moving magnetic fields through the aluminum cap 50.

Figure 6:
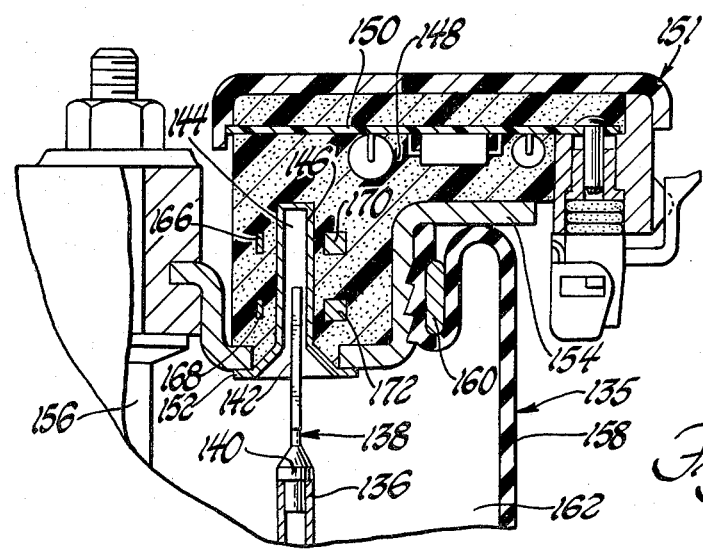
FIG. 6 is an elevational view partly in section of a portion of another embodiment of this invention.

Another embodiment of this invention is illustrated in FIG. 6. This Figure shows a pneumatic suspension spring unit 135 similar to unit 16 of the illustrative first embodiment and requires explanation only in the differences where major constructional and operational changes are involved. These differences mainly involve the Hall effect devices and their control by the internal follower attached to the unsprung mass of the vehicle. It will be understood that the unit of FIG. 6 has the rolling lobe air spring and shock absorber construction equivalent to that of the unit shown in FIG. 2. Furthermore in the second embodiment of the invention only a single follower tube 136 is employed instead of a pair of follower tubes. It will be further understood from the description of the first embodiment that the tube 136 is spring biased upwardly and is telescopically mounted on a rod as are each of the tubes of the first embodiment of this invention. A steel insert 138 carried by the tip of follower tube 136 has a shouldered base 140 received in the end of the tube and a flattened vane 142 that extends upwardly from the base which is adapted to be received in an elongated recess 114 formed by a thin-walled stainless steel insert 146 embedded in the potting compound 148 mounting the component side of the circuit board 150 of the integral height sensor unit 151 which is the same as unit 30 of the first embodiment. The insert 146 has a flared mouth portion 152 which is laser welded or otherwise secured in an air tight manner to the metallic upper cap or cover plate 154 of the pneumatic suspension spring unit which is secured to the sprung mass of the vehicle and to the piston rod 156 of the shock absorber employed therewith which is the same as the shock absorber 42 of the first embodiment. Also, a cylindrical sleeve 158 of fabric reinforced rubber is attached to annular shoulder portion of cap 154 by a band 160 in an air tight manner. The sleeve 158 forms an expandable and contractable pneumatic chamber 162 to which pressurized air is supplied to and exhausted from as in the first embodiment of this invention.

In this embodiment upper and lower Hall effect devices 166 and 168 connected by suitable conductors not shown to the circuit board 150 are embedded in the potting material adjacent to the elongated recess 144. These Hall effect devices sense the magnitude of magnetic fields of corresponding upper and lower permanent magnets 170 and 172 to provide outputs. The circuit of the integral sensor unit 151 responds by producing electrical signal triggering operation of the compressor and exhaust valve as described in connection with the first embodiment of the invention.

In the FIG. 6 embodiment of this invention the magnetic fields are moving with respect to the Hall effect devices. The flux patterns of these fields are interrupted by the flattened vane 142.

In the FIG. 6 position the vehicle is at trim height and only Hall device 166 is activated so that the logic in the sensor unit has the compressor and exhaust valve deactivated. In the event that increased load is added to the vehicle, the pneumatic spring will deflect and roll on piston 128 as the sprung mass moves downwardly towards the unsprung mass. When the field between the magnet 170 and Hall device 166 is interrupted, the control circuitry effects operation of the compressor to supply pressure air to the chamber 162, the exhaust valve remaining inactivated. When this occurs the cap 154 and the sprung mass of the vehicle will be moved upwardly to the trim height condition shown in FIG. 6 at which point the compressor will be shut down.

If an excess amount of pressurized air is supplied to the chamber 162 or if the vehicle is unloaded the spring 135 will move the sprung mass of the vehicle upwardly with respect to the unsprung mass whereby the fields of magnets 170 and 172 are sensed by the associated Hall devices. Under such conditions the circuitry triggers energization of the coil of the exhaust valve so that pressure air is removed from chamber 162. The sprung mass of the vehicle moves downwardly until trim height is obtained and the exhaust valve is once again closed. In this embodiment of the invention the Hall effect devices and the magnets are external of the pneumatic chamber so that no special sealing is needed for these components.

In the FIG. 6 embodiment of the invention the height sensor unit 151 can be replaced by a similar sensor unit with larger or smaller vertical spacing between the magnets and between their associated Hall effect devices to correspondingly increase or decrease the width of the trim or null zone. In the FIG. 2 embodiment this is readily accomplished by varying the lengths of the two follower tubes 58 and 60. Thus by having a small differential in the lengths of follower tubes 58 and 60 a narrow trim zone is established and conversely by increasing the differential in the lengths of follower tubes 58 and 60 a correspondingly wider trim zone is readily established. After the height differential is set the uppermost position of the follower tubes can, as stated above, be adjusted upwardly or downwardly as a unit to accordingly adjust the trim zone upwardly or downwardly with respect to the unsprung mass.

While preferred embodiments of this invention have been shown and described to illustrate the invention, other modifications will become apparent to those skilled in this art. Accordingly, the scope of this invention is set forth in the following claims:

The embodiment of the invention in which an exclusive property or privilege is claimed are defined as follows:

1. A control system for adjusting the relative position of two members relatively movable with respect to one another comprising motor means operatively disposed between and interconnecting said members for movement toward and away from one another, follower means having telescoping parts mounted internally of said motor means and operatively connected to one of said members and movable therewith relative to the other of said members, spring means for yieldably holding said telescoping parts in an extending position, said parts of said follower means being telescoped together against the force of said spring in response to the predetermined movement of said members toward one another, Hall effect device means supported by the other of said members externally and at one end of said motor means for sensing the position of said follower means, an electrically energized control circuit, said Hall effect device means being responsive to the position of said follower means and operatively connected to said control circuit for triggering said circuit to produce predetermined electrical signals, energizable activator means operatively connected to said control circuit and responsive to said predetermined electrical signals for activating said motor means for moving said members away from one another in response to the positioning of said follower means at a first position with respect to said Hall effect device means and to further effect movement of said members toward one another in response to the positioning of said follower means at a second position with respect to said Hall effect device means, and said first and second positions being at a pre-determined distance from one another to define a zone in which said motor means is free of activation by said circuit and said activator means.

2. A control system for adjusting the relative position of two members relatively movable with respect to one another comprising motor means formed by a pneumatic spring operatively disposed between and interconnecting said members for movement toward and away from one another, follower means mounted internally of said pneumatic spring and operatively connected to one of said members and movable therewith relative to the other of said members, said follower means having first and second telescoping parts and spring means for biasing said parts in an outward position, Hall effect device means supported by the other of said members and at one end of and externally of said pneumatic spring for sensing the position of said follower means, an electrically energized control circuit, said Hall effect device means being responsive to the position of said follower means and operatively connected to said control circuit for triggering said circuit to produce pre-determined electrical signals, electrically energizable compressor means operatively connected to said control circuit and responsive to said pre-determined electrical signals for supplying pressurized gas to said pneumatic spring for linearly elongating said spring for moving said members away from one another in response to the positioning of said follower means at a first position with respect to said Hall effect device means, electrically controlled exhaust valve means operatively connected to said control circuit for exhausting air from said pneumatic spring to permit said members to relatively move toward one another in response to the positioning of said follower means at a second position with respect to said Hall effect device means, said first and second positions being at a predetermined distance from one another to define a deflection zone for said pneumatic spring in which said compressor means is inactive and said exhaust valve means is closed.

3. In an automatic leveling system for a vehicle having sprung and unsprung masses, an air spring comprising a column of gas confined within a cylindrical sleeve of resilient polymeric material interconnecting said sprung and unsprung masses, a double acting shock absorber operatively disposed within said sleeve interconnected between said sprung and unsprung masses for damping the oscillatory action of said air spring, electrically driven compressor means for supplying gas to said sleeve to increase the height of said column of gas confined therein to thereby increase the suspension spring spacing between said sprung and unsprung masses, electrically controlled exhaust valve means for exhausting pressurized gas from said sleeve to decrease the height of said column of gas to thereby decrease the suspension spring spacing between said sprung and unsprung masses, first and second magnetic means longitudinally spaced from one another within said column providing magnetic fields which extend externally of said air spring follower means mounting said magnetic means for movement in a predetermined path within the limits of said gas column, connector means operatively connecting said follower means to one of said masses so that said follower means and said magnetic means move in said path distances proportional to the relative movement of said masses, Hall effect device means externally and at one end of said air spring means for sensing movement of said magnetic means and triggering said compressor means and said exhaust valve means to effect supply of pressurized gas to said chamber when said masses are disposed at pre-determined minimal distances from another and exhaust pressurized gas from said chamber when said masses are disposed at a pre-determined maximum distance from one another, said Hall effect device means having a null zone permitting limited relative movement between said minimal and maximum distances without triggering operation of said compressor means and said exhaust valve means.

4. In an automatic leveling system for a vehicle having sprung and unsprung masses, an air spring comprising a column of gas confined within a rolling lobe cylindrical sleeve of resilient polymeric material interconnecting said sprung and unsprung masses, a double acting shock absorber operatively disposed within said sleeve interconnected between said sprung and unsprung masses for damping the oscillatory action of said air sprung, electrically driven compressor means for supplying gas to said sleeve to increase the height of said column of gas confined therein to thereby increase the suspension spring spacing between said sprung and unsprung masses, electrically controlled exhaust valve means for exhausting pressurized gas from said sleeve to decrease the height of said column of gas to thereby decrease the suspension spring spacing between said sprung and unsprung masses, cap means operatively connecting one end of said sleeve to said sprung mass of said vehicle, a sensor unit supported by said cap means, an insert extending into said sensor unit through the under side of said cap means to form an elongated recess pneumatically connected to said column of gas, first and second magnets vertically spaced from one another and supported in said sensor units adjacent to a first side of said recess, first and second Hall effect device means vertically spaced from one another and supported in said sensor unit for respectively sensing the magnetic field of said first and second magnets, follower means attached to said unsprung mass of said vehicle, said follower means having a van portion adapted to interrupt the fields of said magnets when inserted a pre-determined distance into said recess, electrically energizable circuit means operatively connected to said Hall device means for triggering said compressor means and said exhaust valve means in response to the positioned said vane means with respect to said recess to effect supply of pressurized gas to said chamber when said masses are disposed at a pre-determined minimal distance from one another and exhaust pressurized gas from said chamber when said masses are disposed at a pre-determined maximum distance from one another, said Hall effect device means having a null zone permitting limited relative movement between said minimal and maximum distances without triggering operation of said compressor means and said exhaust valve said means.

5. A suspension and leveling system for maintaining a vehicle at a set trim height having sprung and unsprung masses, a polymeric rolling lobe sleeve adjustable in length interconnecting said sprung and unsprung masses, said sleeve confining a column of gas subject to compression and expansion and whose elasticity provides a spring resiliently mounting said sprung mass over said unsprung mass, control means for supplying gas to said sleeve to increase the gas pressure therein to elongate the same to increase the distance between said sprung and unsprung masses, said control means further incorporation gas pressure exhaust means for exhausting pressurized gas from said chamber to decrease the length of said chamber and thereby the distance between said sprung and unsprung masses, first and second magnetic means within said gas chamber providing separate magnetic fields which extends externally of said sleeve, a pair of follower means of unequal length separately mounting said magnetic means for movement in a pre-determined path within the limits of said sleeve, connector means operatively connecting said follower means to at least one of said masses so that said follower means and said magnetic means move in said path distances proportional to the relative movement of said masses, sensor means external of said magnetic means for sensing movement of said magnetic means and triggering said controls to effect supply of pressurized gas to said chamber when said masses are disposed at a pre-determined minimal distance from another and exhaust pressurized gas from said chamber when said masses are disposed at a pre-determined maximum distance from one another, said sensor having a null zone permitting limited movement of said sprung mass relative to said unsprung mass between said minimal and maximum distances without gas being supplied to or exhausted from said cylinder, and means extending externally of said spring for adjusting said follower means with respect to at least one of said masses to thereby adjust the trim height of said vehicle.

6. In a level control system for an automotive vehicle having sprung and unsprung masses, air spring means yieldably interconnecting said sprung and unsprung masses, movable follower means within said air spring means reflecting the distance between said sprung and unsprung masses, compressor means pneumatically connected to said air spring means for supplying pressurized gas thereto for increasing the length of the column of gas confined therein, exhaust valve means for exhausting gas from said air spring means to decrease the length of the column of gas confined in said air spring, Hall effect device means responsive to the distance between said sprung and unsprung masses and the corresponding movement of said follower means for controlling said compressor means and said exhaust valve means to accordingly lengthen or shorten said gas column, said control means including means to establish a trim zone of a predetermined width and adjustment means for adjusting said follower means within said air spring means for widening or narrowing said trim zone.

* * * * *